United States Patent [19]
Nashiki

[11] Patent Number: 5,659,233
[45] Date of Patent: Aug. 19, 1997

[54] CONTROLLER FOR CONTROLLING MOTOR TRANSFERRING POWER BETWEEN A PLURALITY OF POWER SOURCES

[75] Inventor: Masayuki Nashiki, Niwa-gun, Japan

[73] Assignee: Okuma Corporation, Nagoya, Japan

[21] Appl. No.: 589,466

[22] Filed: Jan. 22, 1996

[30] Foreign Application Priority Data

Jan. 24, 1995 [JP] Japan .................................. 7-009235

[51] Int. Cl.[6] ............................................... H02P 7/01
[52] U.S. Cl. .................. 318/440; 318/376; 318/442; 318/500
[58] Field of Search ...................... 318/254, 376, 318/377, 440, 441, 442, 500, 720, 722, 759, 760, 762, 770, 800, 801, 803; 363/67, 71

[56] References Cited

U.S. PATENT DOCUMENTS 4,375,612 3/1983 Wirth ...................................... 318/767
5,471,125 11/1995 Wu ........................................ 318/803

*Primary Examiner*—Bentsu Ro
*Attorney, Agent, or Firm*—Oliff & Berridge

[57] ABSTRACT

A motor controller includes a power source VG for driving a motor 1, a power source VRG for regenerating energy generated in the motor 1, and a power converter for transferring energy from the power source VRG to the power source VG. Windings of the motor are connected, at their opposite ends, to the power source VG and collectors of transistors TR1 to TR3, respectively. Diodes D1 to D3 are connected to nodes of the windings and the transistors TR1–TR3 such that magnetic energy generated in the motor 1 is supplied to the power source VRG. This configuration enables the motor controller to have a reduced number of transistors for driving the windings, and the power sources to be effectively utilized. Further, the motor controller can use a discharge circuit of small power consumption type, which can reduce heat generated in the motor controller.

20 Claims, 12 Drawing Sheets

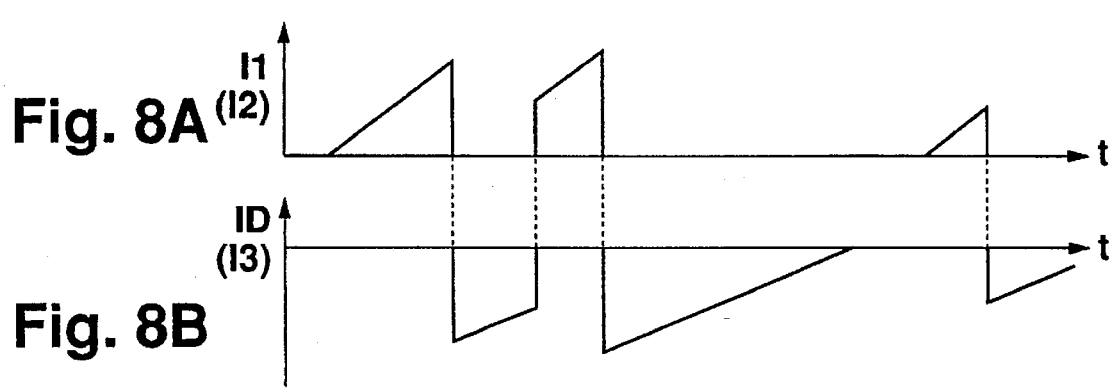

5,659,233

1

CONTROLLER FOR CONTROLLING MOTOR TRANSFERRING POWER BETWEEN A PLURALITY OF POWER SOURCES

TECHNICAL FIELD

The present invention relates to a motor controller which comprises a reduced number of elements, and is compact in size and has a highly effective operation.

BACKGROUND OF THE INVENTION

FIG. 1 of the accompanying drawings shows the configuration of a conventional controller for controlling motors.

Referring to FIG. 1, the controller generally comprises a motor 6 having windings WU, WV and WW, an arithmetic unit 7 for calculating control items and generating given signals, and a power amplifier.

The power amplifier uses 2-phase AC commercial power sources R and S, and is connected to these power sources via a reactor LLP and a diode bridge DB1. The reactor LLP reduces higher harmonics of the AC power sources while the diode bridge DB1 performs full-wave rectification. A DC current and a DC voltage are supplied to a capacitor CC3 via the reactor LLP and the diode bridge DB1. When the power amplifier has a large capacity, 3-phase AC power sources will be frequently utilized.

Transistor bridges TR21 to TR26 constituting an invertor are connected to the arithmetic unit 7 via bases thereof, and are controlled by this unit 7. The invertor supplies drive currents IU, IV and IW to the windings WU, WV and WW of the motor 6 so as to drive the motor 6. These drive currents IU, IV and IW are 3-phase AC currents which differ from each other in phase by 120°.

Diodes are disposed between collectors and emitters of the transistor bridges TR21 to TR26 so as to supply the currents in a direction opposite to these transistors.

Electric current detectors CT2, CT3 and CT4 are respectively connected to one end each of the windings WU, WV and WW so as to detect drive currents flowing therethrough. These detectors CT2-CT4 detect the drive currents to the windings, and provide signals indicative of detected results to the arithmetic unit 7, which controls the transistor bridges TR21 to TR26 in response to these signals, thereby performing torque control of the motor.

A discharge resistor RD and a discharge transistor TR27 are juxtaposed, in this order, between an upper power source VH and a lower power source VL of the power amplifier and the capacitor CC3 is also connected between the two power sources. When the motor has large regenerative energy, a voltage VH-VL across the capacitor CC3 becomes too large. In such a case, the discharge transistor TR27 is actuated under the control of the arithmetic unit 7, and an electric discharge is performed via the discharge resistor RD and the discharging transistor TR27. Thus, the voltage VH-VL across the capacitor is maintained at an appropriate value. A current detector CT5 is connected to a collector of the discharge transistor TR27, detects a collector current, and provides a signal indicative of the detected collector current.

The arithmetic unit 7 is substantially electrically insulated from the power amplifier, receives command signals from a host control unit without via an isolator, and generates a control power source 8 for the arithmetic operation. On the basis of data concerning the drive currents flowing through the windings WU, WV and WW, the detected voltage VH-VL across the capacitor CC3 detected by the current detector CT1 and so on, the arithmetic unit 7 provides the predetermined drive signals to the bases of the transistors TR21-TR27 of the invertor, and supplies the predetermined discharging signal to the base of the discharge transistor TR27.

Outputs PTR21-PTR27 of the control power source 8 are power sources for operating transistors in the power amplifier, and are electrically insulated from one another.

The motor 6 may be an induction motor, a synchronous motor, a reluctance motor, or the like. The controller as shown in FIG. 1 functions to enable the motor to operate without any problem.

The motor controller configured as shown in FIG. 1 can function without any problem, but is somewhat disadvantageous in that it is expensive and bulky.

Referring to FIG. 1, a number of transistors are used to drive the windings of the motor, which means that it is rather difficult to down-size the controller.

Since the arithmetic unit 7 is electrically isolated from the power amplifier, insulated power sources are required and are connected to respective transistors so as to operate them. Electrical insulation between the arithmetic unit 7 and the power amplifier necessitates disposing the current detectors and voltage detectors at specified portions of the power amplifier so as to operate the motor effectively. This makes it difficult to down-size the controller. Further, detector isolators are required as the detectors are rather expensive, which tends to make the controller disadvantageous due to its increased cost.

The transistor driving signals have to be transmitted to the transistors via isolators such as photo-couplers, which are required for the respective transistors.

When excessive power is regenerated in the motor and the power is supplied to the power source VH during the regeneration of the motor, a discharge circuit is necessary so as to enable the power source VH to have an appropriate potential. Since a large current flows through the discharge resistor of the discharge circuit, the controller as well as the discharge resistor is prone to a problem that it is heated.

The foregoing controller rectifies commercially supplied power so as to obtain drive power for the transistors. Since the commercially supplied power has a relatively large voltage fluctuation, the transistors should have a voltage rating which is compatible with such a voltage fluctuation of the commercial power. Thus, the conventional controller suffers from the foregoing problem.

It is conceivable to down-size the foregoing controller by reducing the number of transistors as power elements. For example, the motor windings are connected to a high voltage power source at ends thereof, and to power elements at the other ends thereof. Then, power is supplied from the high voltage power source to the power elements. Such a controller is rather ineffective compared with the controller shown in FIG. 1. Therefore, there have been strong demands for less expensive but more reliable controllers.

SUMMARY OF THE INVENTION

It is an object of the present invention to provide a motor controller which can overcome the foregoing problems of the prior art device, and is compact in size and can drive a motor effectively.

According to a first aspect of the invention, there is provided

A motor controller for controlling a motor driven by predetermined drive currents applied to windings of the motor, the motor controller comprising:

(a) a first power source connected to one end each of the windings, the first power source providing the windings with a first voltage corresponding to a potential difference to a reference source of a power amplifier;

(b) power elements disposed between the reference power source and the other ends of the windings, the power elements supplying the predetermined drive currents to the windings;

(c) a second power source connected to the windings at the other ends thereof via a diode element, the second power source providing the windings with a second voltage for regenerating energy of the motor; and (d) first power converting means for transferring power between the first and second power sources.

In the foregoing arrangement, it is possible to reduce the number of power elements for introducing predetermined drive currents to windings of the motor. Further, the motor controller is made compact in size, has a reduced cost, and effectively utilizes the power sources.

The first power converting means comprises: a reactor including a first coil whose one end is connected to the first power source and a second coil which is adjacent to the first coil and has one end connected to the second power source; a diode having a cathode connected to the other end of the first coil and providing the first coil with a current flowing toward the first power source; and a switching element connected to the other end of the second coil, and wherein when the switching element is switched at predetermining times, the first power converting means transfers given magnetic energy from the second coil to the first coil, thereby transferring power from the second power source to the first power source.

Further, the motor control may include a third power source for outputting a DC voltage, and a second power converter for transferring power between the first and third power sources.

In other words, the motor controller includes the first power source connected to the windings of the motor, the second or third power source whose potential differs from that of the first power source, and the first and second power converters for transferring power between the first and second power sources, and between the first and third power sources.

The power converters are effective in permitting magnetic energy produced by the motor to be supplied to the second power source or to be stored in the third power source. Further, the regenerated or stored power can be transferred to the first power source, and used for driving the windings. Thus, this configuration is also effective in making the motor controller small in size and less expensive, and assuring efficient operation of the motor controller through effectively using the energy regenerated by the motor.

Even when the motor controller is operated with commercial power sources having a large voltage fluctuation, power can be transferred between optional power sources having different potential. Thus, the power sources for operating the power element and switching elements can easily maintain their constant voltages. It is not necessary to determine voltage ratings of the power element and switching elements depending upon the voltage fluctuation of the power sources. This means that the power supply voltages can be efficiently used.

The energy from the motor is once regenerated or stored in the second and third power sources. It is not necessary to use a discharge switching element or discharge resistors of small power consumption type between the first power source and the reference power source. Thus, the motor controller is free from heat generated in the discharge circuit, and reduces heat generated therein. This is effective in down-sizing the motor controller.

The first or second power converting means comprises: a reactor including a first coil having one end connected to an m-th power source and the other end connected to a first switching element, and a second coil which is adjacent to the first coil and has one end connected to an n-th power source and the other end connected to a second switching element; a first diode having a cathode connected to a node of the first coil and the first switching element and providing the first coil with a current flowing toward the m-th power source; and a second diode having a cathode connected to a node of the second coil and the second switching element and providing the second coil with a current flowing toward the n-th power source, and wherein when the first and second switching elements are switched at predetermining times, the first power converting means transfers given magnetic energy between the second coil and the first coil, thereby transferring power between the n-th and the m-th power sources.

Alternatively, the first or second power converting means may comprise: a first transistor having a collector connected to an n-th power source; a first coil having one end connected to an emitter of the first transistor and the other end connected to an m-th power source; a first diode having a cathode connected to a node of the first coil and an emitter of the first transistor and transferring a current flowing from the reference power source to the first coil: a second coil having one end connected to the m-th power source: a second transistor having a collector connected to the other end of the second coil: and a second diode having an anode connected to a node of the second coil and a collector of the second transistor and a cathode connected to the n-th power source, and wherein when the second transistor is switched at predetermined times, thereby transferring power from the m-th power source to the n-th power source.

The first or second power converting means may comprise: a third coil having one end connected to an m-th power source whose voltage is smaller than a voltage of an n-th power source; a third transistor having a collector connected to the other end of the third coil; a third diode having an anode connected to a node of the third coil and the third transistor and a cathode connected to the n-th power source, a fourth transistor having a cathode connected to a collector of the third transistor and supplying a current toward the third coil; and a fourth transistor having a collector connected to the n-th power source and an emitter connected to a node of the third coil and the third transistor, and wherein when the third transistor is switched at predetermined times, the first or second power converting means transfers power from the n-th power source to the m-th power source.

The reference power source of the power amplifier for driving the motor is connected to a reference power source of an arithmetic unit which generates predetermined signals for controlling the power element.

The motor controller further includes a current detecting resistor disposed between the power element and the reference power source.

The motor controller further includes voltage dividing resistors disposed between the first power source and the reference power source and between the second power source and the reference power source, and detecting potentials of the first and second power sources.

The foregoing configuration enables the motor controller to detect currents and voltages of the reference power source and power element without using an expensive isolator or the like. Further, it is possible to reduce insulated power sources for operating the power element, and remarkably reduce the number of components, which makes the motor controller less expensive.

The motor controller further includes means for receiving control commands from a host control unit in an electrically insulated manner. This is effective in overcoming problems such as poor insulation or noise in the power amplifier, and improving the reliability of the motor controller as a system.

BRIEF DESCRIPTION OF THE DRAWINGS

The present invention will become more apparent from the following detailed description of presently preferred embodiments when taken in conjunction with the accompanying drawings, in which like reference numerals refer to like parts throughout.

FIGS. 8A and 8B are time charts showing the operation of the power converters in the first and second embodiments.

DESCRIPTION OF THE PREFERRED EMBODIMENTS

Figure 1:
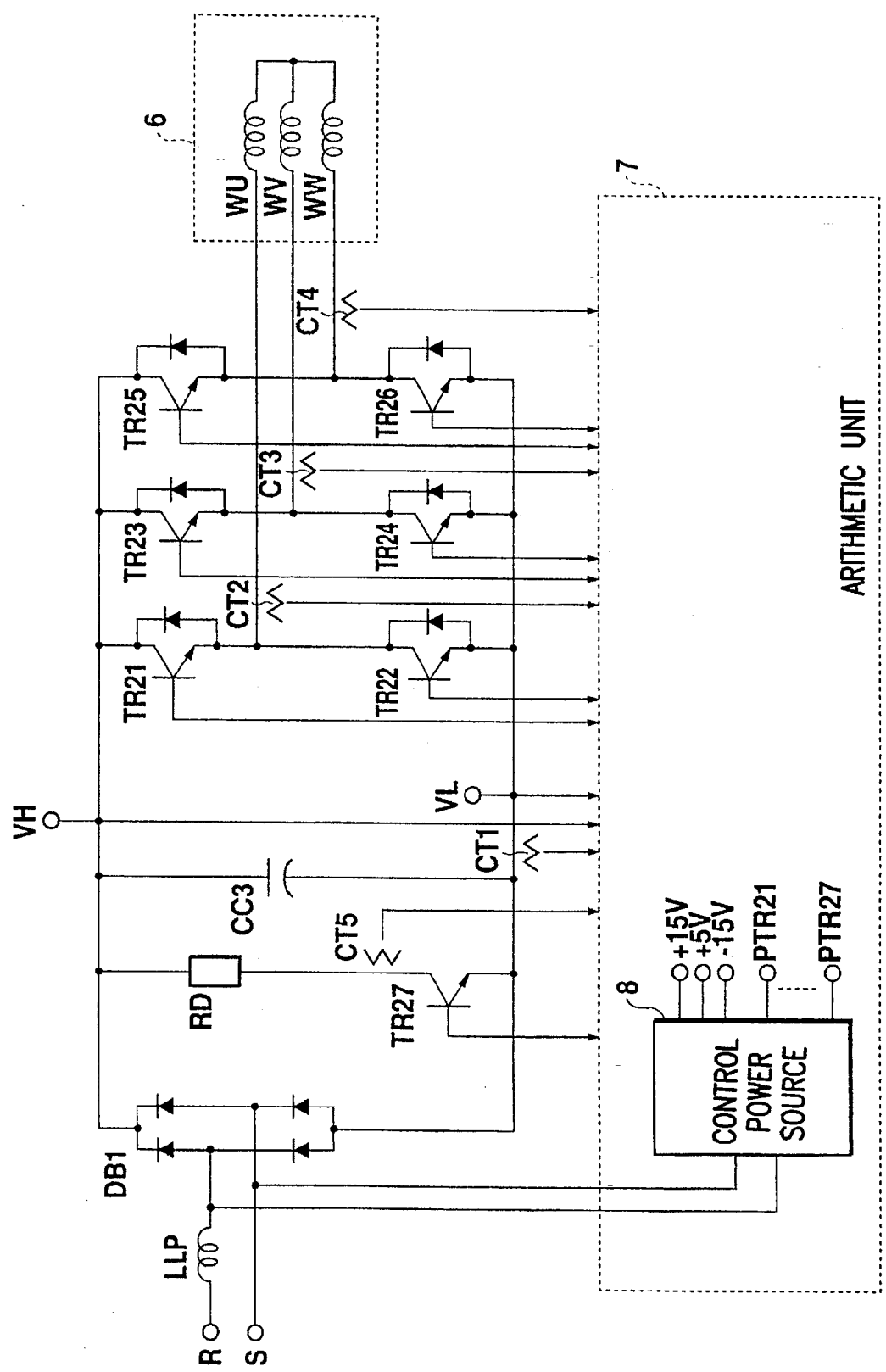
FIG. 1 is a block diagram showing the configuration of a conventional motor controller.

The invention will be described with reference to preferred embodiments shown in the drawing figures.

Embodiment 1

(A Motor and a Motor Controller)

Figure 2:
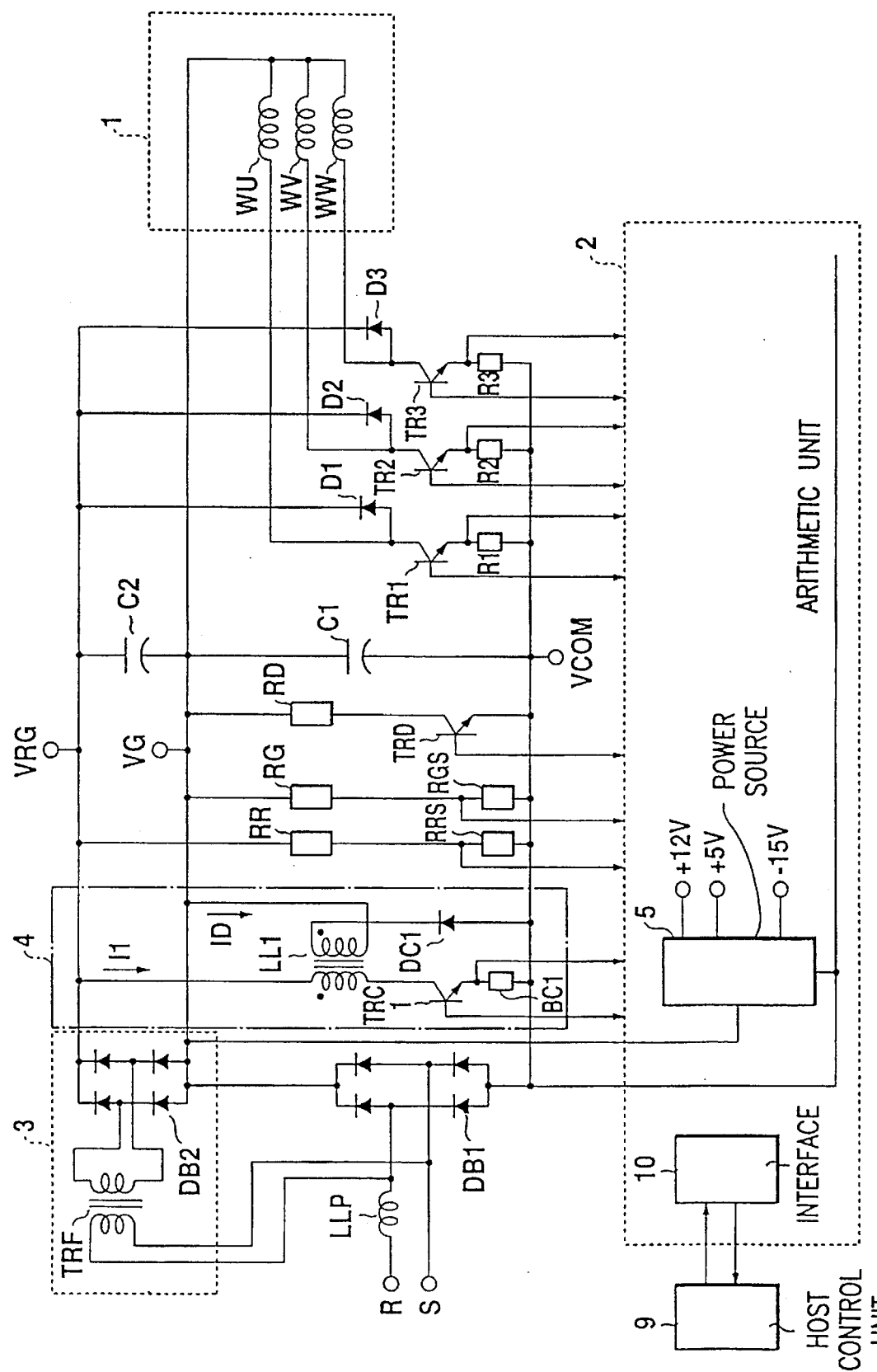
FIG. 2 is a block diagram showing the configuration of a motor controller according to a first embodiment of the invention.

FIG. 2 shows the configuration of a motor controller according to a first embodiment of the invention. A motor 1 includes three phase windings WU, WV and WW, and is an induction motor, a synchronous motor, a reluctance motor, or the like. The motor 1 is shown as a three phase motor above, but the motor having the different number of phases is not eliminated.

A controller for the motor 1 comprises an arithmetic unit 2, and a power amplifier including transistors TR1 to TR3 for providing given drive currents to the windings WU, WV and WW.

Referring to FIG. 2, a host control unit 9 provides various commands to an interface 10 of the arithmetic unit 2, and controls the motor 1 on the basis of various control data arriving via the interface 10.

(The Power Amplifier)

The power amplifier receives power from 2-phase commercial power sources R and S, which are connected to a reactor LLP for reducing high harmonics and a diode bridge DB1 for the full-wave rectification. DC currents are supplied to a capacitor C1 via the reactor LLP and the diode bridge DB1. When the motor controller has a large capacity, 3-phase AC power sources are usually utilized.

Further, when the motor 1 generates a large amount of regenerated energy, it is also possible to use not only the 3-phase AC commercial power sources but also a converter as the power sources constituted by transistor bridges which can receive energy in bidirection.

The capacitor C1 constitutes a first power source VG at one end, and has a reference power source. i.e. potential VCOM at the other end.

In the motor 1, the windings WU, WV and WW are connected, at their opposite ends, to the first power source VG and to collectors of the drive transistors TR1 to TR3, respectively. The transistors TR1 to TR3 supply the drive currents to the windings WU, WV and WW, respectively.

The transistors TR1 to TR3 are NPN transistors, and are connected, at emitter sides, to the reference power source VCOM via current detecting resistors R1 to R3, and, at bases, to the arithmetic unit 2. The transistors TR1 to TR3 are actuated in response to given control signals from the arithmetic unit 2 such that the drive currents are supplied to the windings WU, WV and WW of the motor 1. The windings WU, WV and WW receive the 3-phase drive currents which differ in phase from each other by 120°.

Anodes of diodes D1 to D3 are respectively connected to the transistors TR1–TR3 and the windings WU, WV and WW, respectively. Cathodes of the diodes D1–D3 are connected to a second power source VRG having a potential different from that of the first power source VG.

When the transistors TR1–TR3 are turned off, the currents to the winding WW, WV and WW are caused to flow to the second power source VRG via the diodes D1–D3, so magnetic energy or mechanical dynamic energy of the motor 1 are regenerated and are supplied to the second power source VRG.

As soon as the controller is turned on, the power sources R and S supply DC currents and voltages to a capacitor C2 via the reactor LLP and a charging circuit 3. Therefore, the second power source VRG is kept at a given potential.

The charging circuit 3 includes a transformer TRF for transforming the voltages of the received power in accordance with a capacity of the capacitor C2, and a diode bridge DB2 which is connected to the transformer TRF and full-wave rectifies the transformed voltages. The ends i.e. the electrodes of the capacitor C2 are respectively connected to the diode bridge DB2. A voltage of the second power source VRG depends upon a voltage at one end of the capacitor C2. The first power source VG is connected to the other end of the capacitor C2. As can be seen in FIG. 2, the energy stored in the capacitor C2 is not used for driving the motor 1. Thus, the charging circuit 3 can have a small capacity.

Potential dividing resistors RG and RGS are sequentially inserted between the first power source VG and the reference power source VCOM. Further, potential dividing resistors RR and RRS are sequentially inserted between the second power source VRG and the reference power source VCOM. The potential dividing resistors RG, RGS and RR, RRS detect voltages of the respective power sources VG and VRG, and provide signals indicative of the detected voltages to the arithmetic unit 2.

A discharge resistor RD and a discharge transistor TRD are sequentially inserted between the first power source VG and a common power source VCOM.

A power converter 4 transfers surplus energy of the second power source VRG to the first power source VR when regenerated energy of the motor 1 is supplied to the second power source VRG during powering and/or regenerating of the motor.

The power converter 4 includes a reactor LL1 having first and second coils which are adjacent to each other but mutually insulated, a diode DC1 connected to the first coil, and a transistor TRC1 connected to the second coil.

The first coil of the reactor LL1 is connected, at one end thereof, to the first power source VG, and, at the other end thereof, to a cathode of the diode DC1. The second coil of the reactor LL1 is connected, at one end, to the second power source VRG, and, at the other end, to a collector of the transistor TRC1. The diode DC1 is connected, at its anode, to the common power source VCOM, thereby providing the first coil with a current flowing toward the first power source VG. An emitter of the transistor TRC1 is connected to the reference power source VCOM via a current detecting resistor RC1.

Switching on and off the transistor TRC1 at predetermined timing (as described later) enables given magnetic energy to be transferred to the first coil from the second coil, thereby transferring the power from the second power source VRG to the first power source VG.

The operation of the power converter 4 will be described with reference to the time charts shown in FIGS. 8A and 8B.

It is assumed here that the first and second coils of the reactor LL1 (shown in FIG. 2) have the same number of turns. Further, the second power source VRG is assumed to have a capacity approximately twice as large as that of the first power source VG. Actually speaking, it is acceptable for the second power source VRG to have a capacity which is several percent larger than that of the first power source VR so long as the second power source VRG can sufficiently reduce the regenerated current of the motor 1.

When the motor 1 generates a large amount of regenerated energy and the second power source VRG has an extremely large voltage, the arithmetic unit 2 detects this, and turns on the transistor TRC1. Thus, a current I1 from the second power source VRG is made to flow through the second coil of the reactor LL1 toward the transistor TRC1 (as shown in FIG. 8A).

When the transistor TRC1 is turned off at the predetermined timing, the current I1 is interrupted because of the absence of its flow path. Thus, a current ID in the first coil (FIG. 8B), which is magnetically coupled to the second coil, is made to flow to the first power source VG via the diode DC1.

A ratio between the magnitude of the current I1 and that of the current ID in the transistor TRC1 is in reverse proportion to the number of turns of the first and second coils. However, since the first and second coils have the same number of turns in this embodiment, the currents I1 and ID have the same magnitude but flow in opposite directions.

Changing rates of the currents flowing to the first and second power sources VG and VGR are expressed by the general formula (1) of voltage, current and inductance of an active circuit.

$$V = L \cdot dI/dt \quad (1)$$

Since the voltage of the second power source VRG is approximately twice as large as that of the first power source voltage VG, an increasing ratio of the current I1 is approximately twice as large as a reducing ratio of the current ID.

The reactor LL1 can have a relatively small reactance and reduce its cost so long as it can assure a sufficiently high driving frequency for the transistor TRC1.

The current ID and the voltage applied to the reactor LL1 have opposite directions, so the current ID is gradually reduced. When the transistor TRC1 is turned on again during the reduction of the current ID, the current ID is interrupted immediately. Then, the current I1 equivalent to the current ID begins to flow, and increases since it flows in the forward direction which is contrary to the direction of the voltage applied to the reactor LL1.

When the transistor TRC1 is turned off, the current I1 becomes nil while the current ID equivalent to the current I1 begins to flow. Then, the current ID is gradually reduced to zero.

Repetition of the foregoing operation enables the energy of the second power source VRG to be once converted into magnetic energy for the reactor LL1. Then, the magnetic energy is transferred to the first power source VG. In this manner, the energy from one power source is transferred to another power source having a potential different from that of the former power source.

If the motor 1 provides relatively large regenerated energy and the voltage of the first power source VG becomes too large, the arithmetic unit 2 detects this state, and turns on a discharge transistor TRD. Thus, the current flows to the discharge resistor RD so as to consume an excessive current, thereby keeping the voltage of the first power source VG, i.e. the voltage across the capacitor C1, at the proper value.

(The Arithmetic Unit 2)

The motor controller controls the motor 1 on the basis of various signals indicative of detected results and drive signals, all of which pass through the arithmetic unit 2. A power source circuit 5 of the arithmetic unit 2 is connected to the reference power source VCOM of the power amplifier, and has a reference potential which is the same as that of the reference power source VCOM.

The current detecting resistors RC1 and R1–R3, which are disposed between the transistors TRC1 and TR1–TR3 and the reference power source VCOM, detect values of voltage drops therein which are proportional to the current values in these transistors. Thus, the arithmetic unit 2 can use the detected values of the currents flowing through the transistors as control signals, without using an isolator or the like.

Further, the voltage dividing resistors RR, RRS, RG and RGS divide the voltages VRG-VCOM and VG-VCOM. Signals indicative of voltages of appropriate magnitudes are supplied to the arithmetic unit 2. Thus the voltages VRG and VG are detected using the signals in the arithmetic unit 2.

Emitter potentials of the transistors TR1–TR3 and TRC1 are approximately equal to the reference potential VCOM.

Thus, the operation of these transistors can be controlled without providing insulated power sources therefor or without supplying signals in an electrically insulated manner by disposing photo-couplers or the like between the arithmetic unit 2 and the transistors TR1–TR3 and TRC1.

In this embodiment, control information is transferred between the arithmetic unit 2 and the host control unit 9 (for controlling the arithmetic unit 2) in an electrically insulated manner via a photo-coupler or an insulated transformer 10 for signal transmission and reception.

Generally, a reference potential of the host control unit 9 is an earth potential. On the contrary, the reference power source VCOM of the arithmetic unit 2 (shown in FIG. 2) is an appropriate potential generated by the input AC commercial power sources R and S. Thus, the host control unit 9 and the arithmetic unit 2 are electrically insulated since they have different reference potentials.

The motor controller is compatible with various popular communication techniques such as apparatus-to-apparatus communication, FA communication, personal computer communication, and so on.

When the communication is conducted in an electrically insulated manner via the insulated transformer 10 for signal transmission/reception as shown in FIG. 2, the transformer 10 cannot transmit DC signal components. Thus, it is necessary for a time period between high and low levels of the signals to be balanced. This is preferable so as to stabilize signal levels at operating points when employing optical, digital and serial communication, which assures high speed operation.

For instance, the technique used in ETHERNET or the like, which is offered by XEROX Corporation of U.S.A., is effective in the present invention. In this technique, information is coded, such that high and low levels of signals have approximately the same time ratio, transmitted to a receiving side, and decoded to the original form by the receiving side.

Further, use of recently popular micro-processors, communications LSI's or the like allows two-way digital serial communication of a variety of items of information. When maintaining the motor controller, the control information and control items of the arithmetic unit 2 can be recognized and checked by a maintenance device, without inspecting the host control unit (having the earth potential) and the arithmetic unit 2 (having the potential generated by the other power source such as the commercial AC power source) using measuring instruments.

However, when the reference power source VCOM should be kept at the earth potential so as to maintain the motor controller, the reference power source VCOM can be grounded by inserting a compound transformer into the input power sources. However, the compound transformer is rather expensive.

(The Motor)

Figure 3:
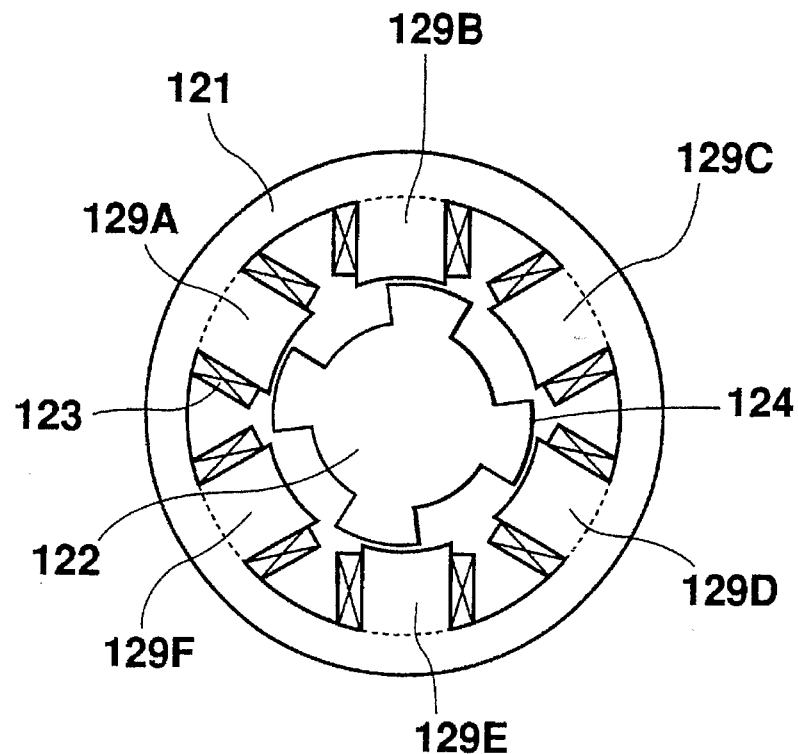
FIG. 3 schematically shows the structure of a motor which is controlled by the motor controller shown in FIG. 2.

FIG. 3 shows an example of a reluctance motor which is preferably controlled by the motor controller of the present invention.

Referring to FIG. 3, the reluctance motor comprises a rotor 122 having four projecting poles 124, and a stator 121 which has projecting six poles 129A to 129F and six windings 123 wound around these poles.

The windings wound around the poles 129A and 129D are in series with each other, and constitute AD-phase windings, which correspond to the winding WU shown in FIG. 2.

The windings wound around the poles 129B and 129E are in series with each other, constituting BE-phase windings, which correspond to the winding WV shown in FIG. 2.

The windings wound around the poles 129C and 129F are in series with each other, constituting CF-phase windings, which correspond to the winding WW shown in FIG. 2.

The reluctance motor shown in FIG. 3 obtains reluctance power and rotational torque when power is sequentially applied to the 3-phase (i.e. AD, BE and CF phases) windings in such a direction that the projecting poles 124 of the rotor 122 are magnetically attracted.

Figure 4:
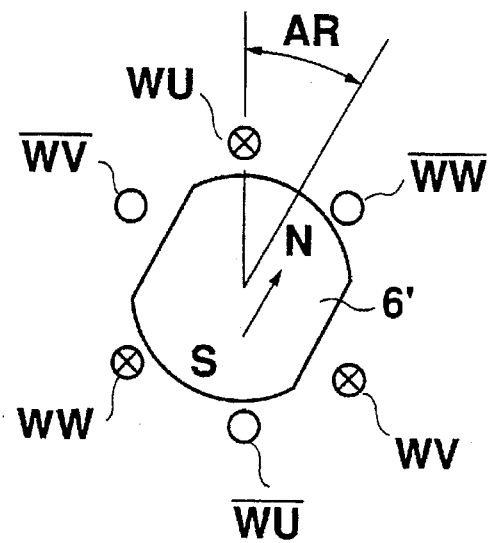
FIG. 4 schematically shows the structure of another motor which is controlled by the motor controller.

The motor controller (FIG. 2) of the invention is also applicable to a synchronous permanent-magnet motor as shown in FIG. 4.

In FIG. 4, the 3-phase windings WU—WU, WV—WV and WW—WW are depicted as concentrated windings.

Figure 5:
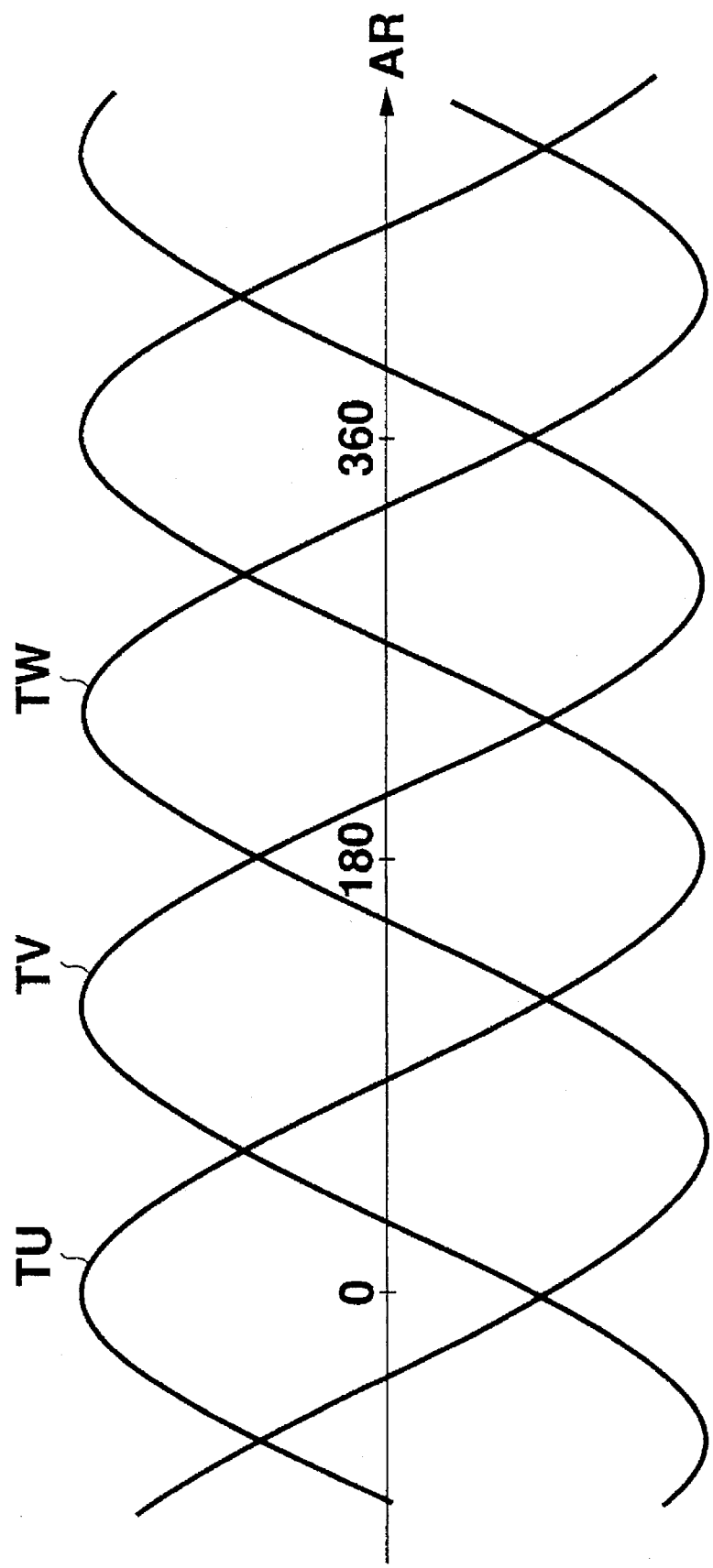
FIG. 5 shows waveforms of rotating torque generated by the motor shown in FIG. 4.

Rotational torques TU, TV and TW are generated at a rotor 6' by currents applied to the windings as shown in FIG. 5. In this case, the rotor 6' has a rotational angle position AR with respect to the WU-phase windings.

It is possible on the basis of the relationship shown in FIG. 5 to optionally control torque, speed and position of the windings by applying the appropriate driving currents to a desired phase of the windings.

With the motor controller of this embodiment, the motor slightly reduces the torque compared with the conventional motor controller. However, this can be overcome by increasing the number of phases of the motor. Thus, torque efficiency and torque ripples can be improved.

Embodiment 2

Figure 6:
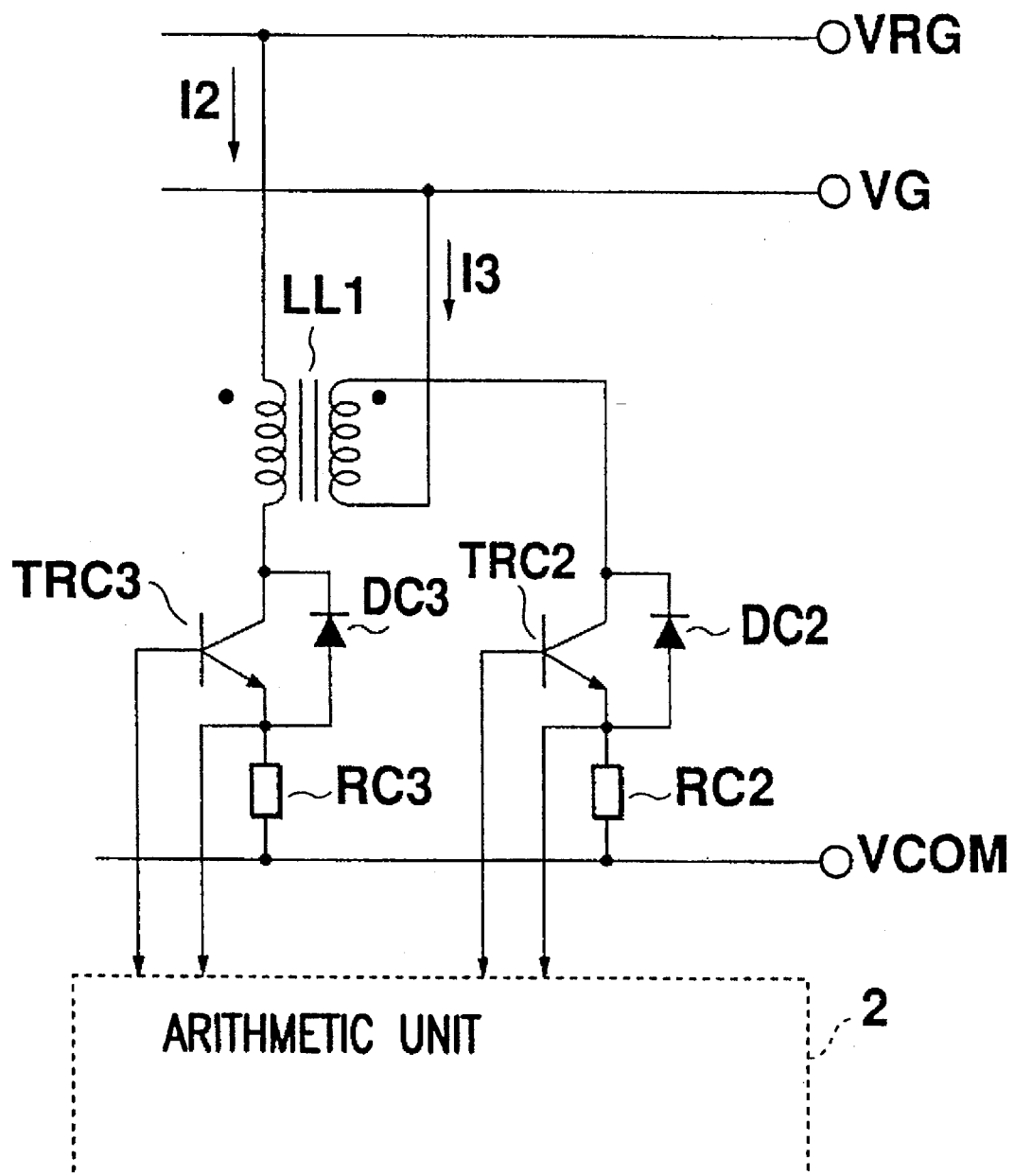
FIG. 6 shows the configuration of a power converter according to a second embodiment of the invention.

A power converter according to a second embodiment is configured as shown in FIG. 6. This embodiment features that power is transferred not only from the second power source VRG to the first power source VG but also from the first power source VG to the second power source VRG.

Similarly to the first embodiment, the reactor LL1 includes the first coil which is connected, at one end, to the first power source VG, and the second coil which is connected, at one end, to the first coil connected to the second power source VRG. The second coil is adjacent to the first coil but is electrically insulated therefrom. The second embodiment differs from the first embodiment with respect to circuits peripheral to the power converter and operation of these circuits.

Specifically, the first coil is connected, at the other end thereof, to the collector of the first transistor TRC2. The first transistor TRC2 is connected, at its emitter, to the reference power source VCOM via the current detecting resistor RC2. The cathode of the first diode DC2 is connected to the node of the first coil and the transistor TRC2. The current flowing toward the first power source VG is supplied to the first coil via the first diode DC2.

The collector of the second transistor TRC3 is connected to the other end of the second coil, and the emitter thereof is connected to the reference power source VCOM via the current detecting resistor RC3. The cathode of the second diode DC3 is connected to the node of the second coil and the transistor TRC3. The current flowing toward the second power source VRG is supplied to the second coil via the second diode DC3.

The power converter of the second embodiment transfers the energy from the first power source VG to the second power source VRG in the same manner as that of the power converter 4 shown in FIG. 2. Specifically, when the transistor TRC3 is turned on, the current I2 begins flowing to the reactor LL1 (the second coil). When the transistor TRC3 is turned off at predetermined timing, the current I2 is interrupted because its path is blocked. Thus, the current I3 shown in FIG. 8B flows to the first coil via the diode DC2.

The ratio of magnitude of the currents I3 and I2 is in reverse proportion to the ratio of the number of turns in the first and second coils. Since the current I3 and the voltage applied to the reactor LL1 are in opposite directions, the current I3 is gradually reduced. When the transistor TRC2 is turned on in the meantime, the current I3 immediately become zero. At this instant, the current I2 equivalent to the current I3 begins to flow, and keeps on increasing since the voltage applied to the reactor LL1 has the same direction as that of the current I2.

Further, turning off of the transistor TRC3 interrupts the current I2. The current I3 equivalent to the current I2 then begins to flow, and is then gradually reduced to zero.

The repetition of the foregoing operation changes the energy of the second power source VRG to the magnetic energy for the reactor LL1. The energy is then transferred to the first power source VG. This means that the energy is transferred from the second power source VRG to the first power source VG having the different potentials.

The energy is transferred from the first power source VG to the second power source VRG as described hereinafter with reference to the time charts in FIGS. 9A and 9B.

As can be seen from FIG. 6, the power converting circuits are symmetrically configured, so the energy is transferred from the second power source VRG to the first power source VG in an opposite manner.

Figure 9A:
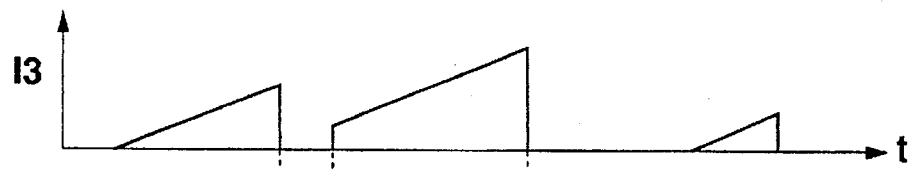
FIGS. 9A and 9B are time charts showing the operation of the power converter in the second embodiment.
Figure 9B:
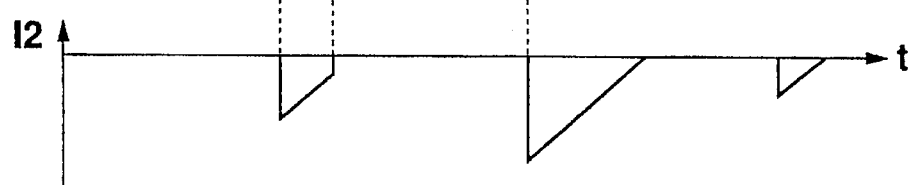

When the transistor TRC2 is turned on, the current I3 beings to flow to one coil of the reactor LL1 as shown in FIG. 9A. The transistor TRC2 is turned off at the predetermined timing, so the current I3 is reduced to zero due to the absence of its flow path. Then, the current I2 is supplied, via the diode DC3, to the other coil of the reactor LL1 which is magnetically connected to one coil of the reactor LL1 as shown in FIG. 9B.

Since the current I2 and the voltage applied to the reactor LL1 are of opposite directions, the current I2 is gradually reduced. When the transistor TRC2 is again turned on in the meantime, the current I2 is interrupted. At this instant, the current I3 equivalent to the current I2 begins to flow. The voltage applied to the reactor LL1 has the same direction as that of the current I3, so the current I3 increases gradually.

The current I3 becomes zero following the turning-off of the transistor TRC2. Then, the current I2 equivalent to the current I3 begins to flow, and is then gradually reduced to zero.

The repetition of the foregoing operation changes the energy of the first power source VG to the magnetic energy for the reactor LL1. The energy is then transferred to the second power source VRG. This means that the energy is transferred from the first power source VG to the second power source VRG having the different potentials.

According to this embodiment, the energy is bidirectionally transferred between the second power source VRG and the first power source VG.

When the power converter of FIG. 6 is applied to the motor controller of FIG. 1, the energy is transferred between the power sources, so the charging circuit 3 (shown in FIG. 2) is dispensable.

In the second embodiment, both the first and second power sources VG and VRG use the same common potential (VCOM). Further, even when these power sources use different common potential (VCOM) and are insulated from each other, the energy can be similarly transferred therebetween. The foregoing two-way energy transfer technique is also suitable for general applications.

Further, the two-way energy transfer is possible between the power sources having different voltages, e.g. one of them may have a large voltage compared with the other.

Embodiment 3

Figure 7:
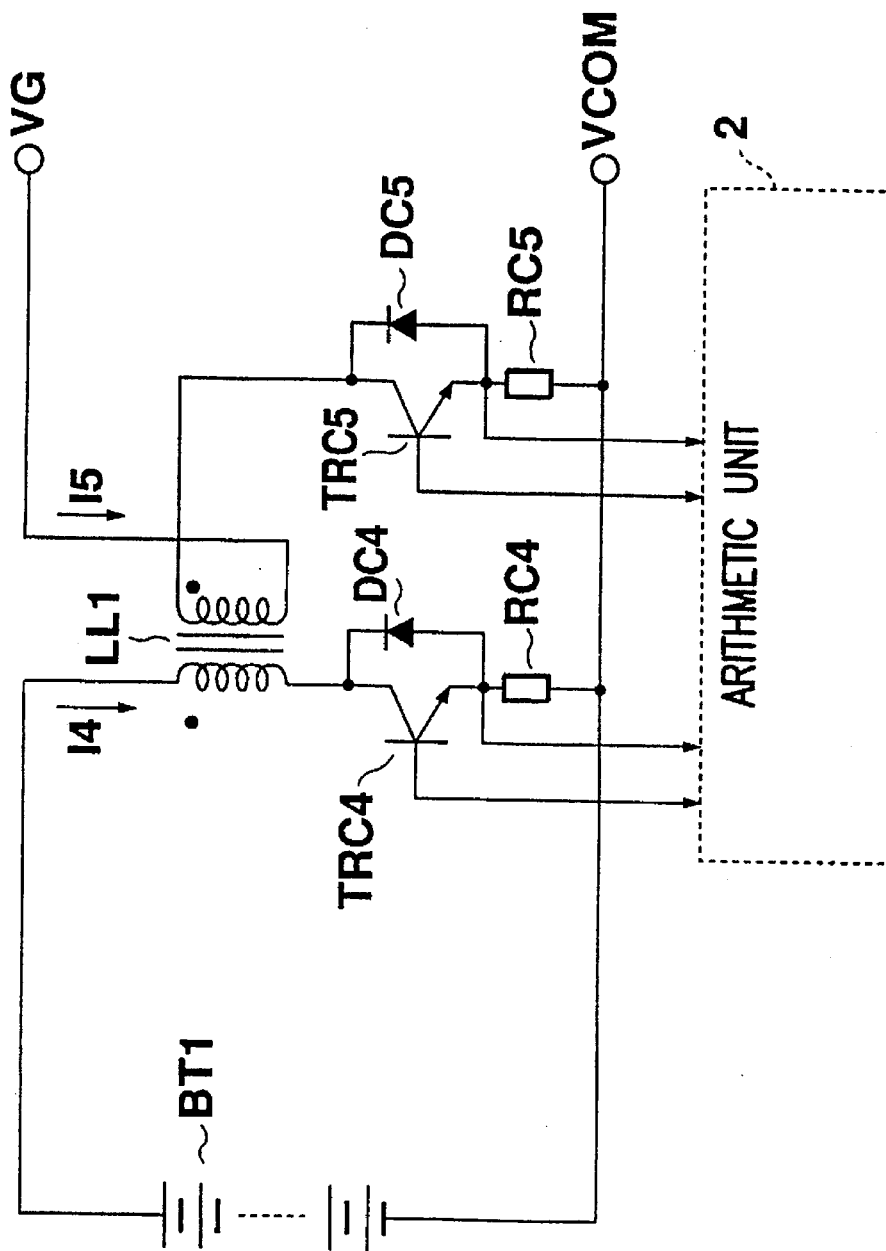
FIG. 7 shows the configuration of a power converter according to a third embodiment of the invention.

In this embodiment, a power converter is used to transfer the energy between the first power source VG and a battery as a third power source, i.e. power of the first power source VG is generated by charging and discharging the battery, as shown in FIG. 7.

The battery has a voltage which is less than that of the first power source VG.

Referring to FIG. 7 showing the configuration of the power converter, a transistor TRC4 and a diode DC4 correspond to the transistor TRC3 and the diode DC3 shown in FIG. 6. Further, a transistor TRC5 and a diode DC5 correspond to the transistor TRC2 and the diode DC2 shown in FIG. 6. Currents I4 and I5 correspond to the currents I2 and I3 shown in FIG. 6. The voltages and relationships between magnitudes of the currents I4 and I5 in the circuit are identical to those shown in FIG. 6, except for the mognituide of the voltage of the battery. Therefore, the operation of this embodiment will not be described here.

It is assumed that the power converter of FIG. 7 is applied to the motor controller (shown in FIG. 2) in the third embodiment. Even when a surplus amount of regenerated energy is supplied to the first power source VG, the battery (the third power source) can store it without discharging it. The resistor RC as the discharge circuit and the discharge transistor TRD are dispensable. Thus, there is no problem of heat being generated by power consumed by the discharge circuit.

The battery energy can be efficiently utilized so as to operate the motor controller since no element consuming a large of amount of energy, such as a series resistor, is used to charge or discharge the battery.

It is very important for the first power source VG to have a stable voltage so as to effectively operate the drive transistors of the motor and the motor in an optimum state. This is effective in accomplishing optimum system planning and reduction of cost, and improving the reliability of the motor controller.

When the motor is controlled using voltages which are obtained by rectifying power from commercial power sources, the power sources may have 20% to 30% voltage fluctuations. System designing is performed such that the motor controller or the motor can cope with such voltage fluctuations.

In this embodiment, the first power source VG can be stabilized by transferring power to and from the battery (shown in FIG. 7) and the first power source VG. This is because the voltage of the first power source VG can be separately detected. Alternatively, when utilizing DC voltages, which are obtained by rectifying commercial power and are relatively variable, the first power source VG can be stabilized by feed-back controlling its DC voltage in response to a signal indicative of its detected voltage, and by transferring the power via the power converter.

When power is supplied to the first power source VG from the battery in the motor controller shown in FIG. 2, the charge circuit 3, discharge circuits RD and TRD, reactor LLP as a power input circuit, and diode bridge DB1 are dispensable from the configuration shown in FIG. 2. Further, the reference power source VCOM can be easily grounded. Thus, the motor controller can have a simplified circuit configuration.

In a case where a plurality of motors 1 are concurrently driven by the motor controller shown in FIG. 2, the transistors TR1–TR3, diodes D1–D3, and current detecting resistors R1–R3 are respectively provided for each of the motors 1, but the remaining circuit elements can be used in common for all of the motors 1. Thus, the motor controller becomes relatively less expensive and requires a reduced space as a whole.

Embodiment 4

Figure 10:
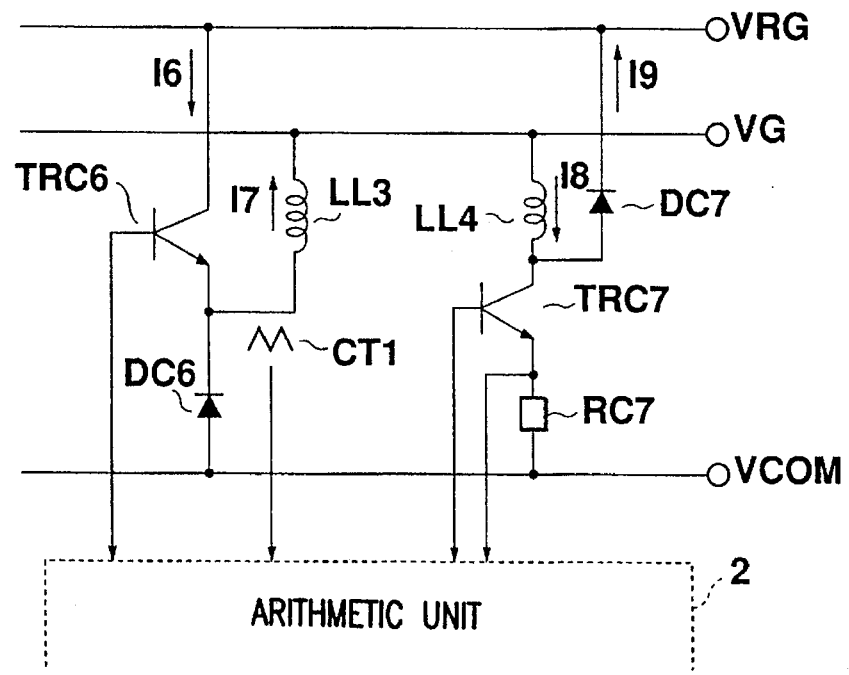
FIG. 10 shows the configuration of a power converter according to a fourth embodiment.

In a fourth embodiment, a power converter is configured as shown in FIG. 10, and operates as shown in the time charts in FIGS. 12A, 12B, 13A and 13B.

Referring to FIG. 10, the second power source VRG is connected to a collector of a transistor TRC6. The transistor TRC6 is connected, at its emitter, to one end of a reactor LL3. The reactor LL3 is connected, at the other end thereof, to the second power source VG. A cathode of a diode DC6 is connected to a node of the reactor LL3 and the transistor TRC6. A current flows to the reactor LL3 from the reference power source VCOM via the diode DC6.

The first power source VG supplies the energy to the second power source VRG when the transistor TRC6 is turned on at predetermined timing.

Specifically, the arithmetic unit 2 turns on the transistor TRC2, so a current I6 flows to the first power source VG via the reactor LL3.

When the transistor TRC6 is turned off, the current I6 is interrupted. Thus, a current I7 equivalent to the current I6 flows to the reactor LL3 via the diode DC6, and is gradually reduced.

The transistor TRC6 is again turned on while the current I7 is being reduced. The current I6 equivalent to the current I7 flows and is gradually increased. When the transistor TRC6 is again turned off in this state, the current I6 becomes zero while the current I7 begins to flow, and is gradually reduced to zero.

The repetition of the foregoing operation enables the energy to be transferred from the second power source VRG to the second power VG, similarly to the power converter 4 shown in FIG. 2.

In the fourth embodiment, since the emitter of the transistor TRC6 is not connected to the reference power source VCOM, an insulated power source should be disposed so as to operate the transistor TRC6.

A power converter, shown at the right side in FIG. 10, is necessary to transfer the energy from the first power source VG to the first power source VRG.

The power converter comprises a reactor LL4 whose one end is connected to the first power source VG, a transistor TRC7 which is connected, at its collector, to the other end of the reactor LL4, and a diode DC7 whose anode is connected to a node between the reactor LL4 and the transistor TRC7 whose cathode is connected to the second power source VRG. The energy is transferred from the first power source VG to the second power source VRG when the transistor TRC7 is switched at predetermined timing.

Figure 13:
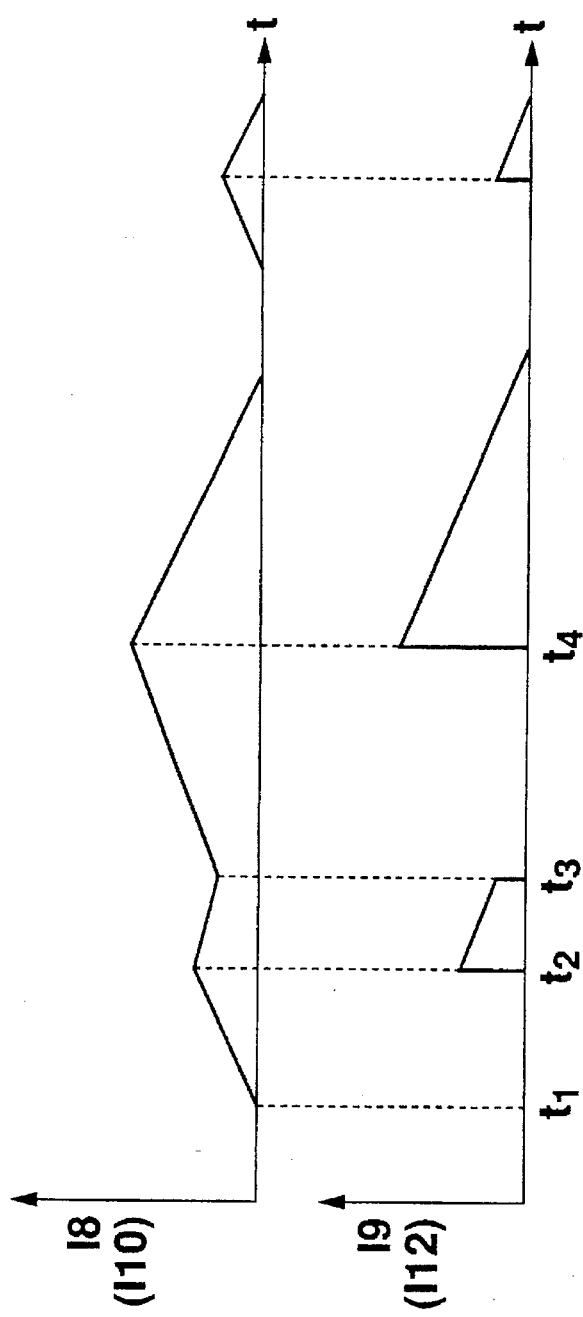
FIGS. 13A and 13B are time charts showing the operation of the power converters in the third and fourth embodiments.

Specifically, the arithmetic unit 2 turns on the transistor TRC7, so a current I8 flows to the reactor LL4 during a period between times $t_1$ and $t_2$, as shown in FIG. 13A. When the transistor TRC7 is turned off at the time $t_2$ while the current I8 is increasing, the diode DC7 is operated, thereby causing a current I9 to flow to the second power source VRG, as shown in FIG. 13B. During a period between $t_2$ and $t_3$, the current I8 is gradually reduced.

When the transistor TRC7 is turned on at the time $t_3$ during the reduction of the current I8, the current I9 flowing to the second power source VRG is reduced to zero while the current I8 is gradually increased during a period between times $t_3$ and $t_4$. In this state, the transistor TRC7 is again turned off, so the current I8 in place of the current I9 flows to the second power source VRG, and is gradually reduced to zero.

The foregoing operation is repeated so as to transfer the energy from the first power source VG to the second power source VRG.

The power converter for transferring power between the battery the embodiment is applied similarly to the motor controller shown in FIG. 2. The energy is transferred from the first power source VG to the second power source VRG so as to charge the capacitor C2. Thus, the reactor LL4, transistor TRC7 and diode DC7 may be composed of elements whose power consumption is relatively small.

Embodiment 5

Figure 11:
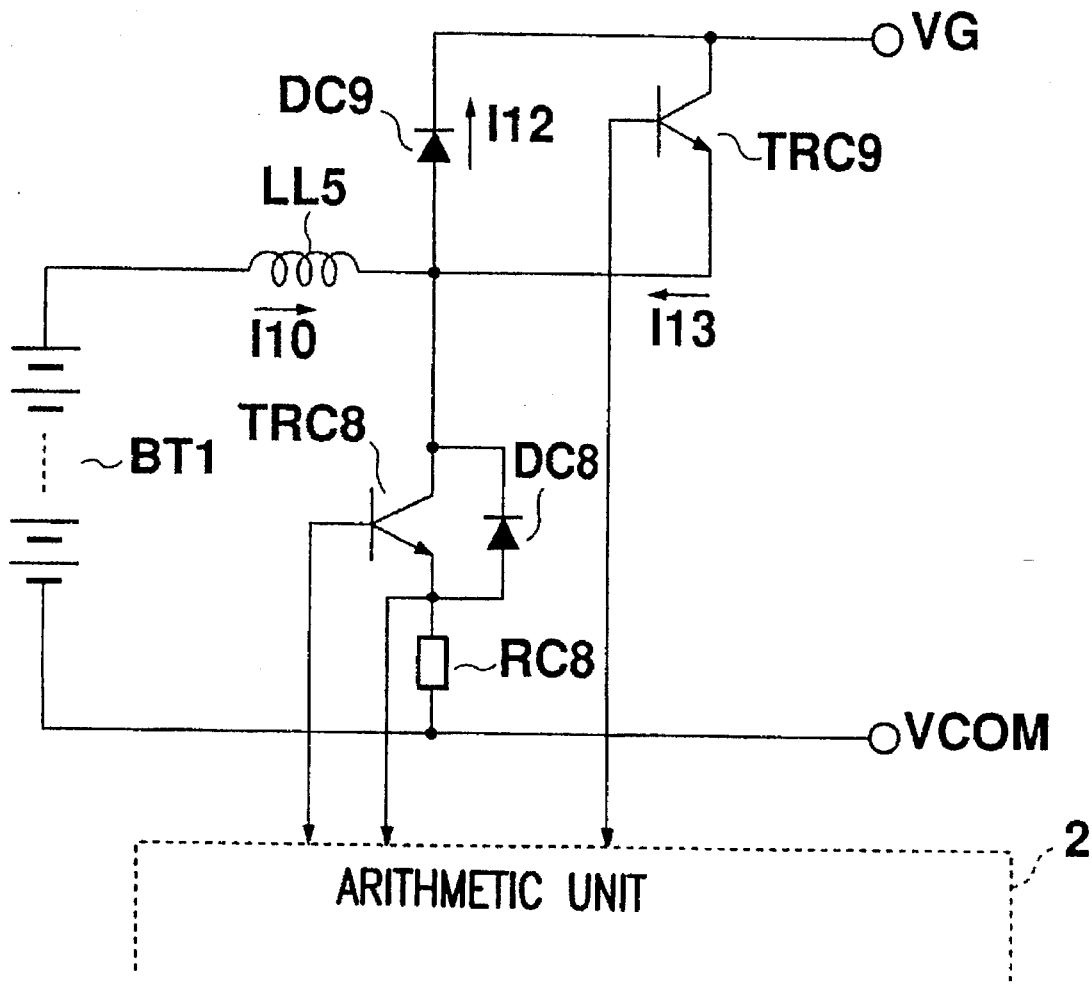
FIG. 11 shows the configuration of a power converter according to a fifth embodiment.
Figure 12:
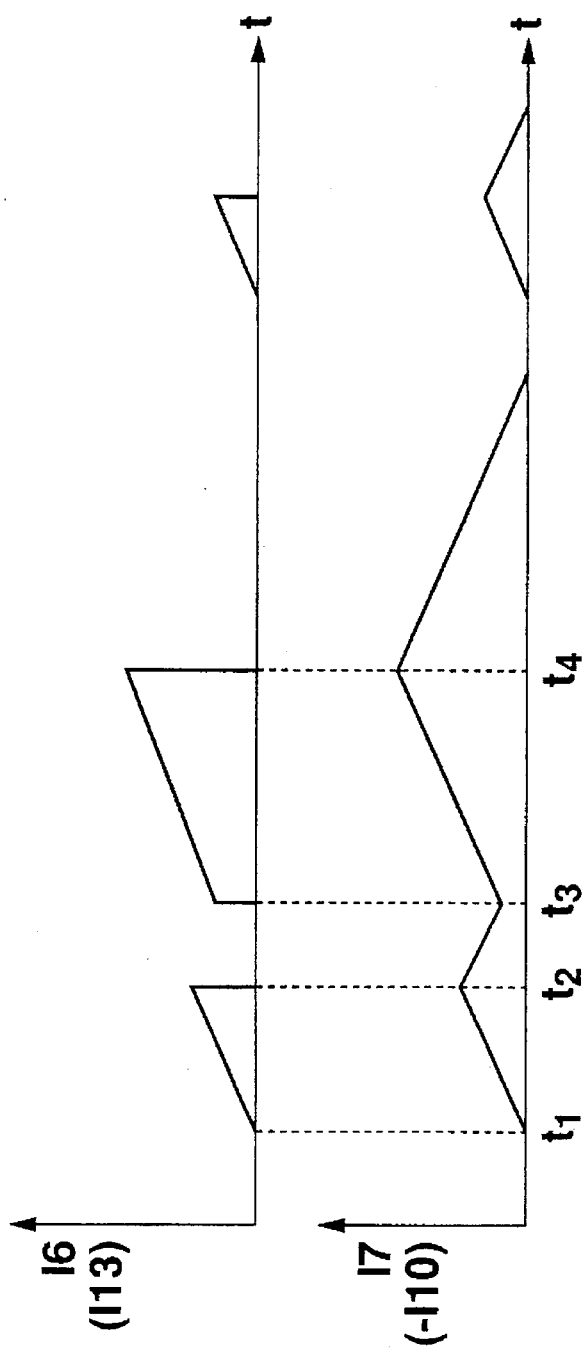
FIGS. 12A and 12B are time charts showing the operation of the power converters in the third and fourth embodiments.

A power converter for transferring power between the battery and the first power source VG (both of which are shown in FIG. 7) is configured as shown in FIG. 11. A voltage of the battery is assumed to be smaller than that of the first power source VG similarly to the third embodiment.

The power converter comprises a reactor LL5 whose one end is connected to the battery, a transistor TRC8 which is connected, at its collector, to the other end of the reactor LL5, a diode DC9 disposed between the other end of the reactor LL5 and the first power source VG, and a transistor TRC9 which is in parallel with the diode DC9 and between the reactor LL5 and the first power source VG.

The diode DC9 is connected, at its anode, to the other end of the reactor LL5, and, at its cathode, is connected to the first power source VG. The diode DC9 causes a current to flow from the reactor LL5 to the first power source VG. A diode DC8 is connected to the collector and emitter of the transistor TRC8 so as to introduce a current from the reference power source VCOM to the reactor LL5.

Energy is transferred from the first power source VG to the battery power source as described hereinafter. When the transistor TRC9 is turned on at the time $t_1$ (shown in FIG. 12A) under the control of the arithmetic unit 2, a current I13 flows from the transistor TRC9. Then, a current –I10 corresponding to the current I13 flows to the battery via the reactor LL5.

When the transistor TRC9 is turned off at the time $t_2$, the current I13 is reduced to zero. The current I10 (–I10) flowing through the reactor LL5 advances via the diode DC8, and is gradually reduced during a period between $t_2$ and $t_3$.

The transistor TRC9 is again turned on during the gradual reduction of the current –I10, the current I13 equivalent to the current –I10 flows from the transistor TRC9, and is gradually increased during the period between $t_3$ and $t_4$. When the transistor TRC9 is again turned off in this state, the current I13 is reduced to zero, and the current –I10 flowing through the reactor LL5 is gradually reduced to zero.

The foregoing operation is repeatedly performed so as to transfer the energy from the first power source VG to the battery power source.

Since the emitter of the transistor TRC9 is not connected to the reference power source VCOM, an insulated power source is necessary so as to operate the transistor TRC9.

The energy is transferred from the battery power source to the first power source VG as described hereinafter.

Referring to FIG. 13A, the transistor TRC8 is turned on at the time $t_1$, so the current I10 flows to the reactor LL5. The transistor TRC8 is turned off during the increase of the current I10. Then, the current I10 is gradually reduced during the period between $t_2$ and $t_3$. In this state, the diode DC9 is operated, so the current I12 flows to the first power source VG via the diode DC9, as shown in FIG. 13B.

The transistor TRC8 is again turned on at the time $t_3$ during the reduction of the current I10. Thus, the current I12 is reduced to zero while the current I10 is gradually increased. When the transistor TRC8 is again turned off in this state, the current I12 equivalent to the current I10 flows to the first power source VG via the diode DC9, and is then gradually reduced to zero.

This operation is repeated so as to transfer the energy from the battery to the first power source VG.

Embodiment 6

Figure 14:
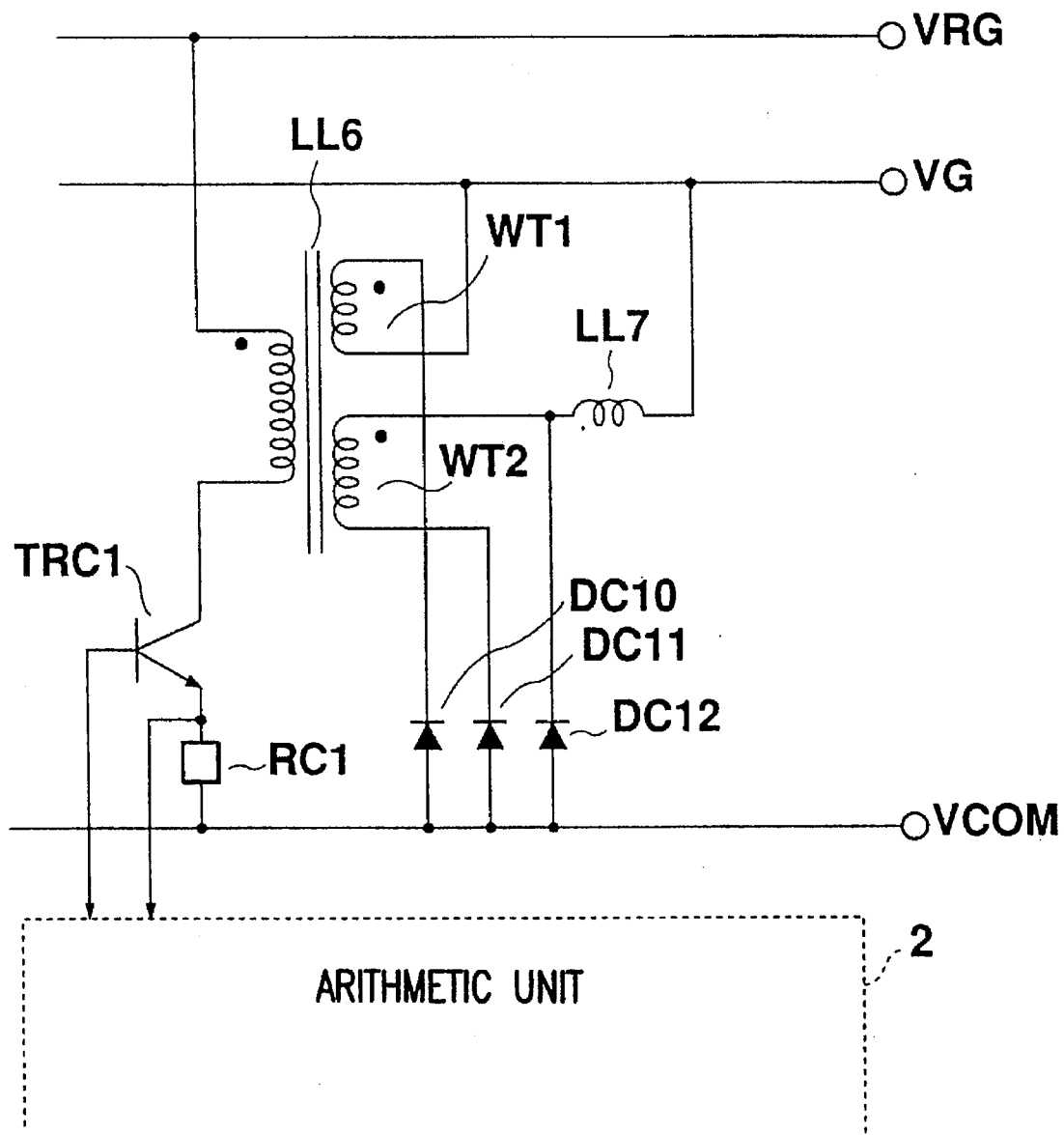
FIG. 14 shows the configuration of a power converter according to a sixth embodiment.

Referring to FIG. 14, the power converter 4 (shown in FIG. 2) is modified in a sixth embodiment. Specifically, a coil WT2 is added to the first coil of the reactor LL1 (shown in FIG. 2), thereby serving as a transformer winding.

As shown in FIG. 14, a reactor LL6 includes the second coil whose one end is connected to the second power source VRG, a coil WT1 corresponding to the first coil, and the coil WT2 adjacent to the second coil. The coil WT2 is connected, at one end, to the first power source VG via a reactor LL7, and, at the other end thereof, to a diode DC11, which passes a current from the reference power source VCOM to the coil WT2. A diode DC12 is connected to a node of the coil WT2 and the reactor LL7 such that a current flows from the reference power source VCOM to the reactor LL7.

In operation, the transistor TRC1 is turned on, thereby exciting the reactor LL6, and inducing a voltage at the coil WT2.

Then, the transistor TRC1 is turned off, so the current to the coil WT2 is reduced to zero. Magnetic energy generated in the reactor LL6 is transferred to the first power source VG from the coil WT1 via the diode DC10. In accordance with a voltage induced at the coil WT2 due to the actuation of the transistor TRC1, electro-motive force is generated at the reactor LL7. The electro motive force, i.e. magnetic energy, is transferred to the first power source VG via the diode DC12.

In the sixth embodiment, the power converter functions not only as a transformer but also as a reactor, and transfers the energy from the second power source VRG to the first power source VG.

This power converter is advantageous in that it can provide the first power source VG with a relatively smooth current, like a DC current. Further, the emitter of the transistor TRC1 has a potential substantially equal to the reference potential VCOM, so it can be easily actuated.

When input commercial AC power sources have relatively large voltages compared with the voltage of the first power source VG in the motor controller of FIG. 2, it is possible to rectify the voltages of the commercial AC power sources and use them for the second power source VRG. In such a case, the charge circuit 3 (shown in FIG. 2) is dispensable, and the power source circuit 5 of the arithmetic unit 2 will be changed to the second power source VRG.

Electrical power is transferred between the power sources having different potentials. Thus, even when the motor supplies relatively large regenerated energy, it is possible to keep constant power source voltages for driving the windings of the motor. Further, the motor controller does not require a discharge circuit, which means that no heat is generated and that the motor controller can be down-sized.

While the invention has been particularly shown and described with respect to illustrative and preferred embodiments thereof, it will be understood by those skilled in the art that the foregoing and other changes in form and details may be made therein without departing from the spirit and scope of the invention. For instance, kinds of motors, the number of phases of the motors, addition of drive transistors depending upon the number of motor phases, or incorporation of filters (for preventing instantaneous overvoltages in various circuits), snubbers, limiters, and so on may be added.

What is claimed is:

1. A motor controller for controlling a motor driven by predetermined drive currents applied to windings of the motor, the motor controller comprising:

(a) a first power source connected to one end each of the windings, the first power source providing the windings with a first voltage corresponding to a potential difference applied to a reference power source of a power amplifier;

(b) power elements disposed between the reference power source and the other ends of the windings, the power elements supplying the predetermined drive currents to the windings;

(c) a second power source connected to the windings at the other ends thereof via a diode element, the second power source providing the windings with a second voltage for regenerating energy of the motor; and (d) first power converting means for transferring power between the first and second power sources.

2. The motor controller as in claim 1, wherein the first power converting means comprises: a reactor including a first coil whose one end is connected to the first power source and a second coil which is adjacent to the first coil and has one end connected to the second power source; a diode having a cathode connected to the other end of the first coil and providing the first coil with a current flowing toward the first power source; and a switching element connected to the other end of the second coil, and wherein when the switching element is switched at predetermined times, the first power converting means transfers given magnetic energy from the second coil to the first coil, thereby transferring power from the second power source to the first power source.

3. The power controller as in claim 2, wherein the first power converting means comprises: a third coil having one end connected to a third power source whose voltage is smaller than a voltage of the first power source; a third transistor having a collector connected to the other end of the third coil; a third diode having an anode connected to a node of the third coil and the third transistor and a cathode connected to the first power source, and supplying a current from the third coil toward the first power source; a fourth diode having a cathode connected to a collector of the third transistor and supplying a current toward the third coil; and a fourth transistor having a collector connected to the first power source and an emitter connected to a node of the third coil and the third transistor, and wherein when the third transistor is switched at predetermined times, the first power converting means transfers power from the first power source to the third power source.

4. The motor controller as in claim 1, wherein the first power converting means comprises: a reactor including a first coil having one end connected to the first power source and the other end connected to a first switching element, and a second coil which is adjacent to the first coil and has one end connected to the second power source and the other end connected to a second switching element; a first diode having a cathode connected to a node of the first coil and the first switching element and providing the first coil with a current flowing toward the first power source; and a second diode having a cathode connected to a node of the second coil and the second switching element and providing the second coil with a current flowing toward the second power source, and wherein when the first and second switching elements are switched at predetermined times, the first power converting means transfers given magnetic energy between the first coil and the second coil, thereby transferring power between the second and the first power sources.

5. The motor controller as in claim 1, wherein the first power converting means comprises: a first transistor having a collector connected to the second power source; a first coil having one end connected to an emitter of the first transistor and the other end connected to the first power source; a first diode having a cathode connected to a node of the first coil and an emitter of the first transistor and transferring a current flowing from the reference power source to the first coil; a second coil having one end connected to the first power source; a second transistor having a collector connected to the other end of the second coil; and a second diode having an anode connected to a node of the second coil and a collector of the second transistor and a cathode connected to the second power source, and wherein the second transistor is switched at predetermined times, thereby transferring power from the first power source to the second power source.

6. The motor controller as in claim 1, wherein the power amplifier for driving the motor comprises the power element, and wherein the reference power source of the power amplifier is connected to a reference power source of an arithmetic unit which generates predetermined signals for controlling the power element.

7. The motor controller as in claim 6, further including a current detecting resistor disposed between the power element and the reference power source.

8. The motor controller as in claim 6, further including voltage dividing resistors disposed between the first power source and the reference power source and between the second power source and the reference power source, and detecting potentials of the first and second power sources.

9. The motor controller as in claim 6, further including receiving means for receiving control commands from a host control unit in an electrically insulated manner.

10. The motor controller as in claim 6, wherein a control power source for the arithmetic unit is generated by the first or second power source.

11. A motor controller for controlling a motor driven by predetermined drive currents applied to windings of the motor, the motor controller comprising:

(a) a first power source connected to one end each of the windings, the first power source providing the windings with a first voltage corresponding to a potential difference applied to a reference power source of a power amplifier;

(b) power elements disposed between the reference power source and the other ends of the windings, the power elements supplying the predetermined drive currents to the windings;

(c) a second power source connected to the windings at the other ends thereof via a diode element, the second power source providing the windings with a second voltage for regenerating energy of the motor;

(d) first power converting means for transferring power between the first and second power sources;

(e) a third power source outputting a DC voltage; and (f) second power converting means for transferring power between the first and third power sources.

12. The motor controller as in claim 11, wherein the second power converting means comprises: a reactor including a first coil which has one end connected to the first power source and the other end connected to a first switching element and a second coil which is adjacent to the first coil and has one end connected to the third power source and the other end connected to a second switching element; a first diode having a cathode connected to a node of the first coil and the first switching element and providing the first coil with a current flowing toward the first power source; a first transistor having a collector connected to the other end of the second coil; and a second diode having a cathode connected to a node of the second coil and a second switching element and providing the second coil with a current flowing toward the third power source, and wherein when the first and second switching elements are switched at predetermined times, the second power converting means transfers given magnetic energy between the second coil and the first coil, thereby transferring power between the third and first power sources.

13. The motor controller as in claim 11, wherein the second power converting means comprises: a first transistor having a collector connected to the third power source; a first coil having one end connected to an emitter of the first transistor and the other end connected to the first power source; a first diode having a cathode connected to a node of the first coil and an emitter of the first transistor and transferring a current flowing from the reference power source; a second coil having one end connected to the first power source; a second transistor having a collector connected to the other end of the second coil; and a second diode having an anode connected to a node of the second coil and a collector of the second transistor and a cathode connected to the third power source, and wherein the second transistor is switched on and off at predetermined times, thereby transferring power from the first power source to the third power source.

14. The motor controller as in claim 11, wherein the power amplifier for driving the motor comprises the power element, and wherein the reference power source of the power amplifier is connected to a reference power source of an arithmetic unit which generates predetermined signals for controlling the power element.

15. The motor controller as in claim 14, further including a current detecting resistor disposed between the power element and the reference power source.

16. The motor controller as in claim 14, further including voltage dividing resistors disposed between the first power source and the reference power source and between the second power source and the reference power source, and detecting potentials of the first and second power sources.

17. The motor controller as in claim 14, further including receiving means for receiving control commands from a host control unit in an electrically insulated manner.

18. The motor controller as in claim 14, wherein a control power source for the arithmetic unit is generated by the first or second power source.

19. The power controller as in claim 11, wherein the first power converting means comprises:
- a first transistor having a collector connected to the second power source;
- a first coil having one end connected to an emitter of the first transistor and the other end connected to the first power source;
- a first diode having a cathode connected to a node of the first coil and an emitter of the first transistor and transferring a current flowing from the reference power source to the first coil;
- a second coil having one end connected to the first power source;
- a second transistor having a collector connected to the other end of the second coil; and
- a second diode having an anode connected to a node of the second coil and a collector of the second transistor and a cathode connected to the second power source, wherein when the second transistor is switched at predetermined times, thereby transferring power from the first power source to the second power source.

20. The power controller as in claim 19, wherein the second power converting means comprises: a third coil having one end connected to the third power source whose voltage is smaller than a voltage of the first power source; a third transistor having a collector connected to the other end of the third coil; a third diode having an anode connected to a node of the third coil and the third transistor and a cathode connected to the first power source, and supplying a current from the third coil toward the first power source; a fourth diode having a cathode connected to a collector of the third transistor and transferring a current flowing toward the third coil; and a fourth transistor having a collector connected to the first power source and an emitter connected to a node of the third coil and the third transistor, and wherein when the third transistor is switched at predetermined times, the second power converting means transfers powers from the first power source to the third power source.

* * * * *